Figure 2:
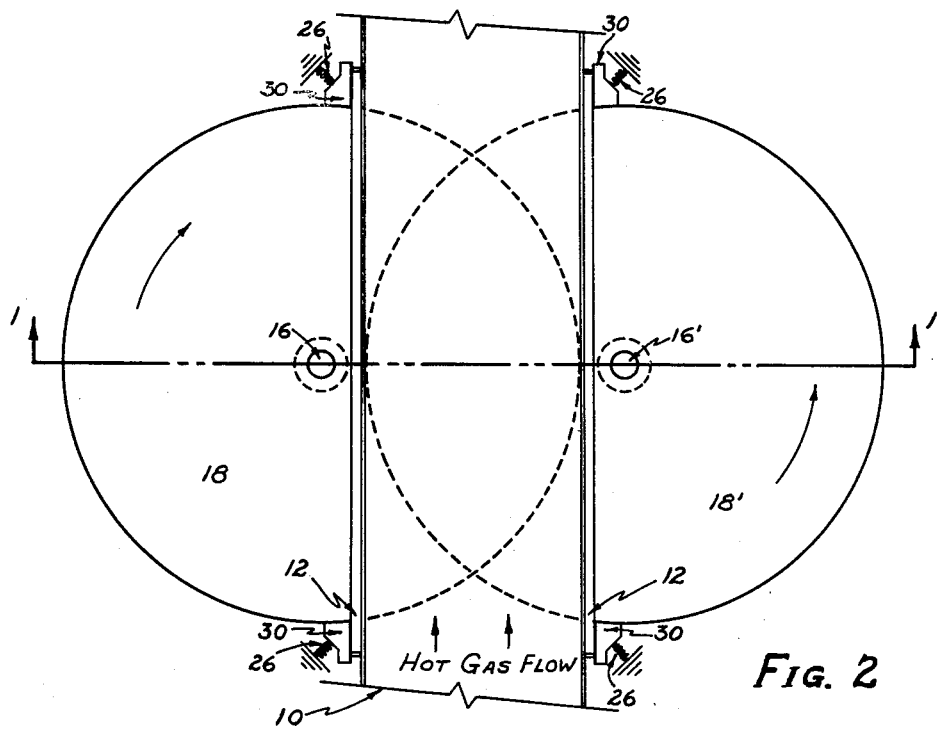

Jan. 5, 1965    G. W. DINGUS    3,164,205
APPARATUS FOR QUENCHING HOT GASES
Filed Feb. 21, 1961

INVENTOR.
GEORGE W. DINGUS
BY

United States Patent Office 3,164,205
Patented Jan. 5, 1965

3,164,205
APPARATUS FOR QUENCHING HOT GASES
George W. Dingus, Pampa, Tex., assignor to Cabot Corporation, Boston, Mass., a corporation of Delaware
Filed Feb. 21, 1961, Ser. No. 90,718
3 Claims. (Cl. 165—6)

This invention relates generally to an apparatus for cooling gases and especially relates to an apparatus for cooling hot aerosols and more specifically to the cooling of the hot reaction products formed by thermally decomposing hydrocarbons or other raw materials in various carbon black production processes.

There are many products of commercial value which are produced in a high temperature reaction which must then be quench cooled. The most notable of such products is carbon black but other illustrations thereof are the various pyrogenic oxides, for example, silica and titanium oxide. The apparatus of the present invention relates to the cooling of the hot aerosols immediately resulting from such pyrogenic processes. These aerosols contain the finely divided solid product of ultimate commercial interest in suspension in the hot flue gases and/or by-product gases formed therewith. In most processes it is generally desirable to cool or quench these hot gases or aerosols quickly and drastically in order to control the quality of the particles suspended therein, by arresting combustion and preventing reactions between the gases and the suspended particles, and also to reduce the temperature of the aerosol so that it may be introduced to the collection equipment at a temperature which will not adversely affect the equipment itself.

In the present day commercial carbon black processes (especially the furnace and thermal processes), the hot aerosols resulting from the decomposition of the carbonaceous raw material are usually immediately passed into a quenching chamber where they are cooled by direct contact with a water spray. This quenching method which is presently in general use throughout the carbon black industry (for the aforementioned processes) has many undesirable ramifications. Chief amongst these undesirable aspects is the fact that the introduction of large amounts of a non-combustible diluent such as water vapor greatly increases the volume of the flue gases (often as much as 100%) with the attendant commercially undesirable ramification of an increase in the required collection unit capacity and resultant overall decrease in the efficiency thereof. Also the addition of a non-combustible diluent such as water to the aerosol greatly diminishes the combustibility of the flue gases remaining after the carbon black has been separated therefrom. Moreover, in the existing commercial practice the moisture-laden aerosols intensify corrosion problems. In addition to the above inherent undesirable aspects of utilizing a direct water quench to cool carbon black flue gases, it should be mentioned that those processes which utilize a water quench also require that the water so utilized be low in mineral content in order not to seriously impair the properties of the produced black by its contamination with such mineral matter. Accordingly, in such processes, special quality control techniques and demineralization steps are often required in order to provide a uniform quality of water for the quench so as to insure the uniform quality of the resulting carbon black product in certain applications. Such a requirement sometimes seriously restricts the location of carbon black plants and/or represents a potential strain on a community's water supply. Accordingly, the present situation in the art of carbon black production points out the desirability and need of a novel process for quenching the hot aerosols resulting from carbon black production processes which would avoid the many inherent undesirable features of the presently used direct water quench.

Also in the other aforementioned processes, that is specifically in the processes for producing pyrogenic silicon oxide and titanium oxide and other processes which require the cooling of hot aerosols but where the use of a water quench may be undesirable or prohibitive, there exists a need for an efficient process for effectively quenching or cooling such aerosols in a manner which does not contaminate or otherwise adversely affect the resulting main product and/or by-products.

The purpose of the present invention is to provide an apparatus which is capable of effectively cooling hot flue gases or aerosols without the use of a direct water quench and accordingly without the attendant inherent undesirable features of such a process.

Another object of the present invention is to provide an apparatus for cooling hot by-product gases without any substantial impairment of the combustibility thereof.

Still another object of the present invention is to cool hot aerosols in a manner so as to increase the efficiency of the collection systems utilized to collect the solid material suspended therein.

Another object of the present invention is to provide for effectively cooling aerosols so that a desirable product of uniform quality may be recovered therefrom.

Still other objects and advantages of our invention will in part be obvious and will in part appear hereinafter.

The above objects and advantages are realized in accordance with the present invention by conducting the hot gases or aerosols to be quenched at a low positive pressure between rotating, substantially circular, continually cooled, metal plates mounted so that a substantial portion of each of said plates extends through the confining walls around the hot gaseous stream with a sliding vapor seal being maintained between each rotating plate and said confining walls. The plates are continually cooled by contacting that portion of same which is outside said hot zone with water or oil or other cooling media. The most advantageous arrangement of metal plates consists of two or more stacks of uniform sized plates with the individual plates of each stack being mounted concentrically and equidistantly spaced apart from one another on a separate rotatable axis and with at least two of the said axes being approximately parallel to one another and being located relative to one another and with respect to the size of said plates so that during rotation the plates, mounted on the two axes, overlap one another interspacially while rotating through the zone in which the hot gaseous stream is flowing. In such an arrangement the hot flue gases or aerosols are continually brought into contact with the cooled portions of the plates which are continually rotating through the conduit while the portion thereof outside of said conduit is continually cooled by liqud spray or other means. Such an arrangement is effective in cooling hot gases and aerosols and rapidly achieves a substantial temperature drop thereof without diluting or contaminating such hot gas streams.

There are many advantages to be realized from the practice of my invention. The chief advantage is that which results from the fact that the cooling of the hot gases in the practice of the present invention is achieved without the addition thereto of a non-combustible diluent, such as water, which would cause the volume of such gases to be greatly increased. Accordingly, when the teachings of the present invention are applied to the cooling of carbon black flue gases or other such aerosols, the required collection unit capacity for effectively removing the carbon black or other solid matter suspended in the so cooled gases is greatly diminished. Also, in the practice of the present invention the combustible nature of the carbon black tail gases is not impaired, as it is by the addition thereto of the large amount of water required in the existing direct water quench process. In existing carbon black processes which utilize the direct water quench, it is usually necessary, in order to readily burn the residual gases, to dry said gases first, e.g. by cooling same to remove water therefrom by condensation. Obviously, this practice seriously affects the heat content of the gases and greatly diminishes the already low fuel value of such tail gases. However, such a loss of recoverable heat and also such costly manipulations of the residual hot flue gases are not encountered in the process of the present invention. Some of the other advantages which flow from the practice of my invention are diminished corrosion problems, a more uniform product, a wider range of applications thereof (e.g. in cooling aerosols in which the use of a water quench is prohibited) and freedom to locate carbon black plants without regard to water supplies.

Figure 1:
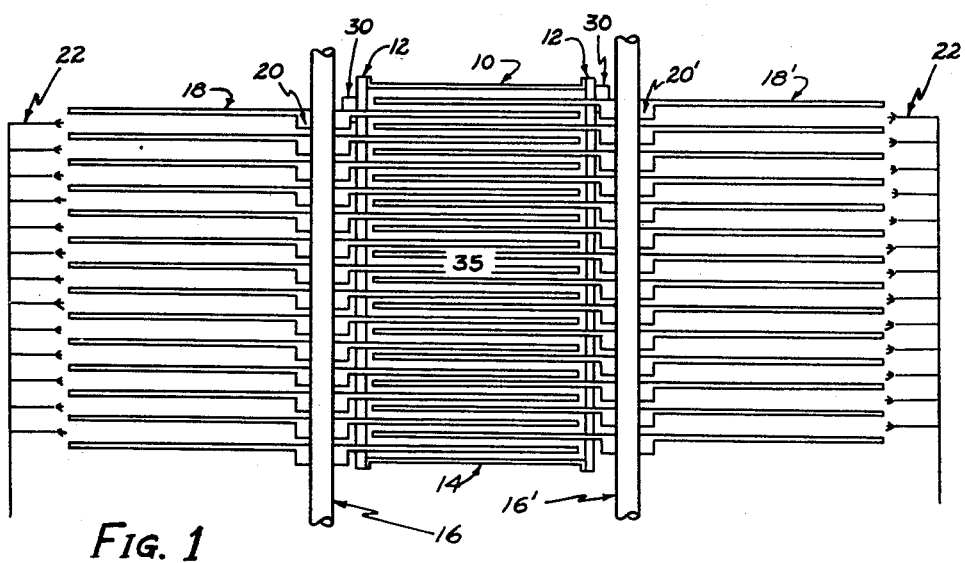

The practice of my invention will be better understood by reference to the attached drawings, in which FIGURE 1 is a view in section of an arrangement of apparatus satisfactory to practice the process of the present invention while FIGURE 2 is a top view of the apparatus of FIGURE 1.

Referring to FIGURE 1, flue passage 35 which is generally located immediately beyond the furnace (not shown) or other such source of hot gas or aerosol is bounded by top wall 10 and bottom wall 14 and by vertical side walls consisting of a series of sealing strips 12 preferably fabricated of, or covered by, graphite or other high temperature sealing material. Said strips 12, which serve as spacers between adjacent rotatable plates in each series are laterally restrained at both ends thereof but are free to settle downwards slightly to compensate for any slight wear which may occur between sliding surfaces of the strips 12 on the one hand and circular metal plates 18 and 18' on the other hand. The two stacks of plates 18 and 18' rotate about vertical shafts 16 and 16' respectively. Plates 18 and 18' are preferably mounted on shafts 16 and 16' by means of a key of the "sliding" or "feather" type. Thus, the plates are restrained on their respective shafts but in such a way as to permit some vertical movement of plates 18 or 18' thereon. The initial position of each plate 18 or 18' should be adjusted on its respective shaft so that the plates rest lightly on the respective strip 12 just beneath same so that the weight thereof is carried by strips 12 beneath same. Thus, each strip supports the plate directly above same with the bottom strip sustaining the weight of all the plates and strips, and if any slight wear of the strips develops, the plates and strips will settle downward slightly to compensate therefor and thereby continually insure and maintain a gas tight seal between the plates and the strips surrounding same. If oil is sprayed on the plates as the cooling medium (22) or if it is used simply as a lubricant between the plates and their respective strips the maintenance of a substantially gas tight seal is greatly facilitated. Plates 18 and 18' may be fabricated of any suitable metal or metal alloy which is sufficiently heat and corrosion resistant and whose thermal conductivity is suitable to permit its effective application to the temperature and chemical conditions of the particular aerosol which is to be cooled. Rotatable shafts 16 and 16' in the illustrated arrangement are preferably placed just outside of flue passage 34 so as to permit a substantial portion of the circular metal plates 18 and 18' to contact the hot gas or aerosol during the rotation of the plates. Also, the vertical spacial relationship between the plates 18 attached to their respective shaft and those plates 18' of the opposite shaft is such that there is a substantially regular alternating spacial relationship between the plates attached to one axis and those attached to the opposite axis while the plates rotate through conduit 34. Rotatable shafts 16 and 16' are preferably rotated independently by any conventional rotating means (not shown), and preferably by means which are capable of varying the speed of rotation of each axis, since, in some application, it may be desirable to vary the speed and the direction of rotation of each shaft in relation to the speed and rotation of the opposite shaft.

Referring now to FIGURE 2 which is a top view of the apparatus of FIGURE 1, shaped blocks 30 mounted at each end of strips 12 are used to seal against the circumferential surface of plates 18 and 18' and the coplanar side faces of adjacent strips 12. Blocks 30 are preferably fabricated of, or covered by, graphite or some other heat resistant sealing material and are mounted so as to fit firmly against the coplanar side faces of both adjacent carbon strips 12 and against the circumferential portions of the intermediate plate 18 or 18' as it rotates about its shaft, for example by being firmly held in this position by springs 26.

In the following illustrative example of the process of the present invention, apparatus substantially similar to that shown in FIGURES 1 and 2 and of a size described in detail hereafter is utilized to quench carbon black aerosol produced by the incomplete burning of a liquid hydrocarbon (with the aid of natural gas). The grain loading of the resulting aerosol is about 5 grains of carbon black per cubic foot. The total flow of the aerosol from the furnace is about 650,000 cubic feet per hour and the temperature of the aerosol is about 2500° F. The aerosol is cooled in a 12 inch square duct having rotating therein 12 circular Monel metal plates ("Monel" is a trademark of the International Nickel Co. Inc. of New York for a wrought nickel-copper alloy containing approximately two-thirds nickel and one-third copper). The plates are of a thickness of ¼ inch and a diameter of 30 inches and are arranged substantially similar to the arrangement described in FIGURE 1 but with six plates in each stack, equidistantly spaced apart from one another by a distance of 1½ inches. The plates are rotated at a speed of about 10 revolutions per minute and are continually cooled by water during that period of their path of rotation which is outside of the flue duct. In the apparatus of this example, the aerosol passes through this arrangement at a rate of about 180 feet per second and continually comes into contact with a total area of about 43 square feet of surface of the relatively cool metal plates. The plate surfaces are at a temperature of about 300° F. at the point at which they enter the hot zone and at about 700° F. at the point where they enter the cooling zone. They show no appreciable warpage and remain relatively free of deposits because of their passing through the substantially gas tight seals formed by the adjacent strips through which the plates pass. Such an arrangement is capable of extracting about 800,000 B.t.u./hr. and a series of such arrangements is capable of reducing the temperature of the aerosol described to about 1400° F. The resulting so cooled aerosol has a grain loading of about 8 grains per cubic foot as compared to a grain loading of about 5 grains per cubic foot which would normally be obtained in cooling a similar aerosol by the direct water quench process. Accordingly, the suspended matter of an aerosol cooled in accordance with the teachings of the present invention can be effectively and efficiently removed by a collection system having a capacity which is much less than that required to collect such aerosols which have been cooled by a direct water quench. After the removal of the carbon black from the aerosol cooled in accordance with the teachings of the present invention, the residual flue gases may be utilized immediately as a combustion gas having a relatively high heating value and without any further treatment thereof as would be required for non-catalytic combustion of the tail gas from the above process had it been cooled by a direct water quench.

Obviously, many modifications and applications of the apparatus and process of the present invention may be introduced without departing from the scope of my invention. For example, the process and apparatus herein disclosed may be applied to a wide variety of aerosols or gases and also the temperature range of the gases introduced thereto may vary. Accordingly, the material of the rotating plates and the number thereof on each shaft and the number of shafts and the arrangement thereof and the speed and direction of rotation thereof and accordingly the temperature drop achieved thereby may vary. Also, the size of the conduit and the design and material of the side strips and the type of cooling medium used to cool the plates may be varied without departing from the scope of my invention. Accordingly, the design of the apparatus of FIGURES 1 and 2 and the process of Example 1 are to be construed as illustrative in nature only and in no way to imply a limit on the scope of the present invention.

Having described my invention what I declare as new and desire to obtain by U.S. Letters Patent is:

1. In a substantially gas tight apparatus for quenching gases without the direct addition thereto of foreign substances in substantial amounts comprising a substantially gas tight vertical walled conduit having means for introducing a hot gaseous stream at one end thereof and for withdrawing the cooled gaseous stream at the other end thereof, the improvement which comprises providing in at least one vertical wall of said conduit a section comprised of a plurality of laterally restrained continuous filler strips composed of a heat resistant material, said strips being free to slide vertically but being spaced apart from one another in a directly superimposed vertical arrangement by means of a series of substantially circular metal plates mounted in a vertically superimposed stack one above another with each plate thereof slidably attached and rotatably connected onto a common vertical, rotatable shaft located immediately to the outer side of the said vertical arrangement of strips so that a substantial portion of each plate passes between two adjacent filler strips and is supported by the strip directly beneath same, and means to seal against the flat coplanar side faces of said strips and the circumferential surface of the plate passing therebetween.

2. Improved apparatus as in claim 1 wherein there is provided in each of two opposite vertical sidewalls of said conduit a section constructed as set forth in claim 1.

3. Improved apparatus as in claim 2 in which the vertical, rotatable shafts of the two respective stacks of plates are substantially closer together than the full diameter of a plate and the vertical positions of the individual plates in each stack are staggered with respect to the vertical positions of the corresponding plates in the other stack so that the plates of one stack overlap in interleaved fashion with those of the other stack.

References Cited in the file of this patent

UNITED STATES PATENTS

| Re. 17,185 | Murray | Jan. 1, 1929 |
| 2,374,608 | McCollum | Mar. 24, 1945 |
| 2,813,698 | Lincoln | Nov. 19, 1957 |
| 2,890,024 | Collman et al. | June 9, 1959 |
| 2,915,297 | Lange | Dec. 1, 1959 |

FOREIGN PATENTS

| 218,807 | Great Britain | July 17, 1924 |
| 590,253 | Canada | Jan. 5, 1960 |